United States Patent
Li et al.

(10) Patent No.: US 9,446,351 B2
(45) Date of Patent: Sep. 20, 2016

(54) FILTRATION MEDIUM AND PROCESS FOR FILTERING A FLUID STREAM

(71) Applicant: MILLIKEN & COMPANY, Spartanburg, SC (US)

(72) Inventors: Shulong Li, Spartanburg, SC (US); Richard A. Mayernik, Simpsonville, SC (US); Xinfei Yu, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 14/552,668

(22) Filed: Nov. 25, 2014

(65) Prior Publication Data

US 2015/0147246 A1    May 28, 2015

Related U.S. Application Data

(60) Provisional application No. 61/908,289, filed on Nov. 25, 2013.

(51) Int. Cl.

| | |
|---|---|
| *B01J 20/22* | (2006.01) |
| *B01D 53/64* | (2006.01) |
| *B01D 39/08* | (2006.01) |
| *B01D 39/16* | (2006.01) |
| *B01D 39/20* | (2006.01) |
| *B01D 46/00* | (2006.01) |
| *B01D 46/54* | (2006.01) |

(52) U.S. Cl.
CPC ............... *B01D 53/64* (2013.01); *B01D 39/08* (2013.01); *B01D 39/1623* (2013.01); *B01D 39/2065* (2013.01); *B01D 46/0027* (2013.01); *B01D 46/0036* (2013.01); *B01D 46/543* (2013.01); *B01D 2239/0407* (2013.01); *B01D 2251/108* (2013.01); *B01D 2251/60* (2013.01); *B01D 2257/602* (2013.01)

(58) Field of Classification Search
CPC ........................................................ B01J 20/22

USPC ........................................................ 502/401
See application file for complete search history.

(56) References Cited

U.S. PATENT DOCUMENTS

| | | | |
|---|---|---|---|
| 4,064,043 A | * | 12/1977 | Kollman ............... B01D 53/02 127/55 |
| 5,336,835 A | | 8/1994 | McNamara |
| 6,734,122 B1 | | 5/2004 | Hunter |
| 7,250,387 B2 | | 7/2007 | Durante et al. |
| 7,494,632 B1 | | 2/2009 | Klunder |
| 7,572,421 B2 | | 8/2009 | Yang et al. |
| 7,618,603 B2 | | 11/2009 | Seames et al. |
| 7,858,061 B2 | | 12/2010 | Varma et al. |
| 8,420,561 B2 | | 4/2013 | Wang |
| 2002/0006757 A1 | | 1/2002 | Wyss |
| 2003/0104937 A1 | | 6/2003 | Sinha |
| 2009/0320678 A1 | | 12/2009 | Chang et al. |
| 2010/0183458 A1 | | 7/2010 | Itabashi et al. |
| 2010/0202946 A1 | | 8/2010 | Yang et al. |

FOREIGN PATENT DOCUMENTS

| | | |
|---|---|---|
| DE | 20 2011 106 028 U1 | 10/2012 |
| GB | 2 122 916 A | 1/1984 |
| GB | 2 484 301 A | 4/2012 |

OTHER PUBLICATIONS

Dranga et al., "Oxidation Catalysts for Elemental Mercury in Flue Gases-A Review", *Catalysts* 2012, 2, 139-170.
PCT/US2014/067238 International Search Report, International filed Nov. 25, 2014, 5 pages.
PCT/US2014/067238 Written Opinion of the International Searching Authority, International filed Nov. 25, 2014, 7 pages.

* cited by examiner

*Primary Examiner* — Edward Johnson
(74) *Attorney, Agent, or Firm* — Robert M. Lanning

(57) ABSTRACT

A filtration medium comprises a textile substrate and a mercury abatement coating on a least a portion of the surface of the textile substrate. The mercury abatement coating comprises a copper salt, a binder, and other optional components. A process for removing mercury from a gaseous stream uses the filtration medium.

27 Claims, 3 Drawing Sheets

FILTRATION MEDIUM AND PROCESS FOR FILTERING A FLUID STREAM

CROSS REFERENCE TO RELATED APPLICATIONS

This application claims, pursuant to 35 U.S.C. §119(e)(1), priority to and the benefit of the filing date of U.S. Patent Application No. 61/908,289 filed on Nov. 25, 2013, which application is hereby incorporated by reference in its entirety.

TECHNICAL FIELD OF THE INVENTION

This application relates to filtration media, filters made from such media, and processes for filtering fluid streams (e.g., gaseous streams) using such media and filters. More specifically, the applications relates to filtrations media designed to capture a portion of the elemental mercury in a fluid stream.

BACKGROUND

Fossil fuels are used to meet many energy needs. For example, coal is used to generate electricity in many regions. The combustion of fossils fuels, such as coal, produces flue gases that are laden with particulates (e.g., soot) and various other materials. For example, the combustion of certain grades of coal can produce flue gases containing appreciable amounts of elemental mercury. If this elemental mercury is released to the environment, it can pose a significant health risk for those living and working in the vicinity of the combustion source (e.g., coal-fired power plant). Due to the hazards posed by the release of untreated flue gases to the environment, regulations have been passed that require these flue gases to be treated in order to remove certain combustion by-products. For example, recently-enacted regulations place a limit on the amount of mercury that can be present in flue gases released to the environment. In order to meet these limits, the flue gases produced by the combustion of many grades of coal must be treated to remove mercury from the flue gas stream.

Filters of various configurations are commonly used to remove particulates from flue gas streams. These filters are effective at removing such particulates, but they are ineffective in removing significant amounts of harmful chemical compounds and elements, such as elemental mercury, from the flue gas stream. Therefore, it would be very beneficial to provide filtration media that can remove both particulates and harmful chemical compounds and elements from a fluid stream. This application seeks to provide such filtration media, filters made from such media, and processes for filtering fluid streams using such media.

BRIEF SUMMARY OF THE INVENTION

In a first embodiment, the invention provides a filtration medium. The filtration medium comprises:
(a) a textile substrate, the textile substrate being permeable to gases and having at least one surface; and
(b) a mercury abatement coating disposed on at least a portion of the surface of the textile substrate, the mercury abatement coating comprising:
 (i) a copper salt comprising copper cations selected from the group consisting of copper(I) cations, copper(II) cations, and mixtures thereof;
 (ii) optionally a chloride salt, provided the chloride salt must be present when the copper salt does not comprise chloride anions;
 (iii) optionally activated carbon particles; and
 (iv) a binder,
wherein the ratio of halide anions to copper cations in the mercury abatement coating is about 2:1 or more.

In a second embodiment, the invention provides a process for removing mercury from a gaseous stream, the process comprising the steps of:
(a) providing a gaseous stream comprising mercury;
(b) providing a filtration medium according to the first embodiment of the invention; and
(c) passing the gaseous stream through the filtration medium, thereby removing at least a portion of the mercury from the gaseous stream.

In a third embodiment, the invention provides a filtration medium comprising:
(a) a textile substrate, the textile substrate being permeable to gases and having at least one surface; and
(b) a mercury abatement coating disposed on at least a portion of the surface of the textile substrate, the mercury abatement coating comprising:
 (i) a copper salt comprising copper cations selected from the group consisting of copper(I) cations, copper(II) cations, and mixtures thereof;
 (ii) an iodide salt; and
 (iii) a binder;
wherein the ratio of halide anions to copper cations in the mercury abatement coating is about 2:1 or more.

DETAILED DESCRIPTION OF THE INVENTION

Figure 1:
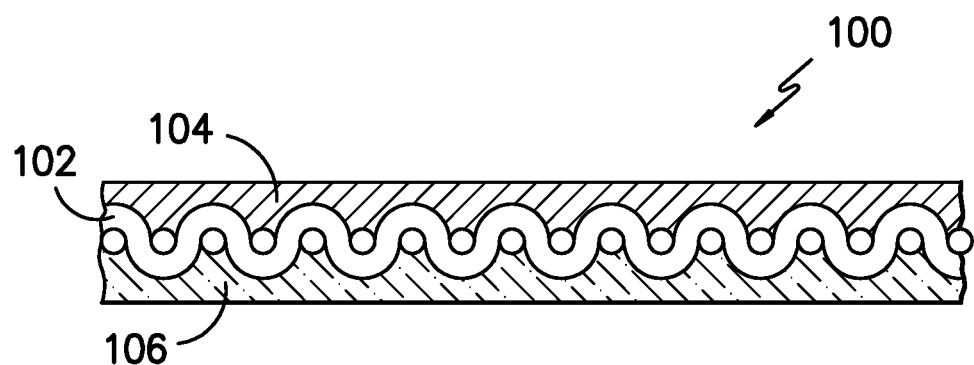
FIG. 1 is a cross-sectional view of an embodiment of the filtration medium of the invention.

In a first embodiment of the filtration medium, the invention provides a filtration medium comprising a textile substrate and a mercury abatement coating disposed on at least a portion of the surface of the textile substrate. A representative embodiment of such a filtration medium is depicted in FIG. 1. The filtration medium 100 comprises a textile substrate 102, which is depicted as a woven textile substrate in FIG. 1, and a mercury abatement coating 104 disposed on at least a portion of the surface of the textile substrate 102.

Figure 2:
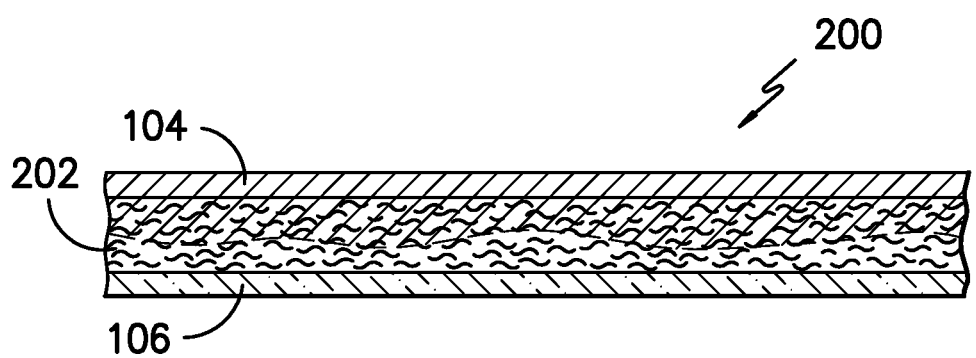
FIG. 2 is a cross-sectional view of another embodiment of the filtration medium of the invention.

The textile substrate in the filtration medium can be any suitable textile substrate that is permeable to gases. The textile substrate can be of any suitable construction, such as a woven textile material or a nonwoven textile material. As noted above, FIG. 1 depicts a filtration medium 100 comprising a woven textile substrate 102. FIG. 2 depicts an alternative embodiment in which the filtration medium 200 comprises a nonwoven textile substrate 202.

In one preferred embodiment, the textile substrate is provided in a woven construction (i.e., the textile substrate is a woven textile material), such as a plain weave, basket weave, twill weave, satin weave, or sateen weave. Suitable plain weaves include, but are not limited to, ripstop weaves produced by incorporating, at regular intervals, extra yarns or reinforcement yarns in the warp, fill, or both the warp and fill of the textile material during formation. Suitable twill weaves include both warp-faced and fill-faced twill weaves, such as 2/1, 3/1, 3/2, 4/1, 1/2, 1/3, or 1/4 twill weaves. In certain embodiments of the invention, such as when the textile material is formed from two or more pluralities or different types of yarns, the yarns are disposed in a patternwise arrangement in which one of the yarns is predominantly disposed on one surface of the textile material. In other words, one surface of the textile material is predominantly formed by one yarn type. Suitable patternwise arrangements or constructions that provide such a textile material include, but are not limited to, satin weaves, sateen weaves, and twill weaves in which, on a single surface of the fabric, the fill yarn floats and the warp yarn floats are of different lengths.

In those embodiments in which the textile substrate is a woven textile material, the woven textile material can be formed from any suitable type of yarn. For example, the woven textile material can be made using filament yarns, spun yarns, or a combination thereof. Suitable spun yarns can be formed by any suitable spinning process, such as ring spinning, air-jet spinning, or open-end spinning. In such embodiments, the spun yarns can be made from a single type of staple fiber, or the spun yarns can be made from a blend of two or more different types of staple fibers.

In another embodiment, such as that depicted in FIG. 2, the filtration medium 200 comprises a textile substrate 202 that is provided in a nonwoven construction (i.e., the textile substrate is a nonwoven textile material). Suitable nonwoven textile materials include but are not limited to dry laid, wet laid, air laid, needlepunched, spunbond, and hydroentangled nonwoven textile materials.

Figure 3:
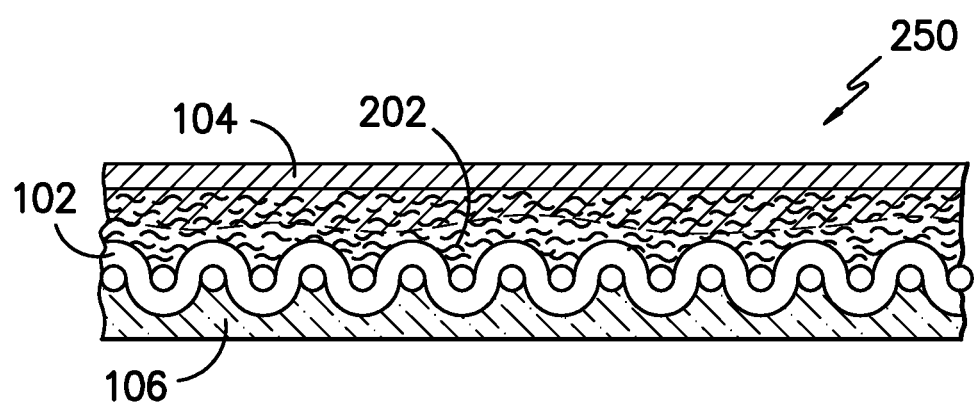
FIG. 3 is a cross-sectional view of another embodiment of the filtration medium of the invention.

In yet another embodiment, such as that depicted in FIG. 3, the filtration medium 250 can comprise more than one textile substrate. For example, as depicted in FIG. 3, the filtration medium 250 can comprise both a woven textile substrate 102 and a nonwoven textile substrate 202 that are joined together. The two textile substrates can be joined together by any means that provides a sufficiently durable bond between the two substrates. For example, the two textile substrates can be stitched together. Alternatively, the two textile substrates can be laminated together using a suitable adhesive. In the event that the substrates are laminated together, care must be taken to ensure that the filtration medium remains sufficiently permeable to gases.

The textile material can be made using any suitable textile fibers. The fibers can be either natural fibers or synthetic fibers. The fibers ideally are capable of withstanding the harsh conditions (e.g., high temperature and corrosive chemicals) encountered in a flue gas stream produced by the combustion of a fossil fuel, such as coal. Accordingly, the textile material preferably comprises synthetic fibers. Suitable synthetic fibers include, but are not limited to, activated carbon fibers, glass fibers, polyphenylenesulfide fibers, polyester fibers, acrylic fibers, ceramic fibers, polyimide fibers, aramid fibers, poly(tetrafluoroethylene) fibers, and mixtures thereof. In one preferred embodiment, the textile material is a woven glass fiber textile.

The filtration medium 100, 200, 250 comprises a mercury abatement coating 104. The mercury abatement coating is disposed on one surface of the textile substrate 102, 202. Depending on the porosity of the textile substrate 102, 202, the mercury abatement coating 104 can penetrate into the interior of the textile substrate. For example, as depicted in FIG. 2, the mercury abatement coating 104 is disposed on the exterior surface of the nonwoven textile substrate 202 and also extends into the interior of the nonwoven textile substrate 202. The mercury abatement coating 104 is permeable to gases, thereby permitting gases to pass through the filtration medium. The mercury abatement coating functions to oxidize elemental mercury contained in a gaseous stream passing through the filtration medium. The resulting oxidized mercury species are more easily removed from the gaseous stream than the elemental mercury originally present in the gaseous stream. The exact mechanism that leads to the oxidation of the elemental mercury in the gaseous stream is not understood due to the complexities of the gaseous stream (e.g., the complex environment of a flue gas stream). However, Applicants have observed that a filtration medium comprising a mercury abatement coating as described below is capable of oxidizing and removing appreciable amounts of element mercury for sustained periods of time. The medium's ability to oxidize mercury over prolonged periods of time is important because it extends the useful life of the filtration medium and reduces downtime and costs associated with the replacement of filters.

The mercury abatement coating comprises a copper salt and a binder. In a first embodiment of the filtration medium, the mercury abatement coating optionally further comprises a chloride salt and activated carbon particles. The mercury abatement coating can comprise any suitable copper salt. Preferably, the copper salt comprises copper(I) cations, copper(II) cations, or a mixture thereof. More preferably, the copper salt comprises copper(II) cations. In a preferred embodiment, the copper salt is selected from the group consisting of $CuCl_2$, $CuBr_2$, $CuI$, $CuSO_4$, $CuNO_3$, $Cu_3(PO_4)_2$, $CuCO_3$, $CuS$, $Cu(OH)_2$, $CuF_2$, $Cu(C_2H_3O_2)_2$ (i.e., copper(II) acetate) and mixtures thereof.

The copper salt can be present in the mercury abatement coating in any suitable amount. Preferably, the copper salt is present in the mercury abatement coating in an amount of about 5 wt. % or more or about 10 wt. % or more based on the total weight of the mercury abatement coating. In another preferred embodiment, the copper salt is present in the mercury abatement coating in an amount of about 60 wt. % or less, about 50 wt. % or less, about 40 wt. % or less, or about 30 wt. % or less based on the total weight of the mercury abatement coating. Thus, in another preferred embodiment, the copper salt preferably is present in the mercury abatement coating in an amount of about 5 to about 60 wt. % (e.g., about 10 to about 60 wt. %), about 5 to about 40 wt. % (e.g., about 10 to about 40 wt. %), about 5 to about 30 wt. % (e.g., about 10 to about 30 wt. %), or about 5 to about 20 wt. % (e.g., about 10 to about 20 wt. %) based on the total weight of the mercury abatement coating.

In a first embodiment, the mercury abatement coating preferably comprises chloride anions. These chloride anions can be provided by the copper salt, for example, when $CuCl_2$ is used. However, when the copper salt does not comprise chloride anions, a chloride salt preferably is included in the mercury abatement coating to provide these chloride anions. This chloride salt can be any suitable salt comprising chloride anions. Suitable chloride salts include, but are not limited to, $AlCl_3$, $CaCl_2$, $MgCl_2$, $NaCl$, $KCl$, $LiCl$, $ZnCl_2$, $FeCl_3$, $NH_3Cl$, and mixtures thereof.

The mercury abatement coating optionally comprises bromide anions. These bromide anions can be provided by the copper salt, for example, when $CuBr_2$ is used as the copper salt. However, when the copper salt does not comprise bromide anions, a bromide salt preferably is included in the mercury abatement coating to provide these bromide anions. The mercury abatement coating can comprise any suitable bromide salt, such as KBr.

The mercury abatement coating can comprise any suitable amount of the chloride and bromide salts described above. Preferably, the ratio of halide anions to copper cations present in the mercury abatement coating is about 2:1 or more. In other words, the mercury abatement coating contains about 2 or more molar equivalents of halide anions for each molar equivalent of copper cations. This ratio is calculated using the total amount of halide anions (e.g., chloride anions and bromide anions) contributed by the copper salt (if it contains halide anions), the chloride salt (if present), and the bromide salt (if present). In a more preferred embodiment, the ratio of halide anions to copper cations present in the mercury abatement coating is about 3:1 or more or about 4:1 or more.

In one specific embodiment, the mercury abatement coating comprises $CuCl_2$ as the copper salt and KBr as a bromide salt. In such an embodiment, the molar ratio of $CuCl_2$ to KBr is about 1:2.

The filtration medium can comprise a source of activated carbon. For example, as noted above, the textile substrate can comprise activated carbon fibers. When the textile substrate comprises activated carbon fibers, the filtration medium need not contain another source of activated carbon. However, another source of activated carbon can be present in the filtration medium. For example, the mercury abatement coating can comprise activated carbon (e.g., activated carbon particles). When the textile substrate does not comprise activated carbon fibers, the mercury abatement coating preferably comprises activated carbon (e.g., activated carbon particles).

As utilized herein, the term "activated carbon" is used to refer to an amorphous form of carbon that has been produced and/or processed so that it possesses a highly porous structure and correspondingly high surface area. For example, in a preferred embodiment, the activated carbon has a BET surface area of about 500 $m^2/g$ or more, about 750 $m^2/g$ or more, about 1,000 $m^2/g$ or more, about 1,250 $m^2/g$ or more, or about 1,500 $m^2/g$ or more.

The activated carbon can be provided in any suitable form. For example, the activated carbon can be a powder, a fine granule (e.g., a granule having an average diameter of about 0.15 mm to about 0.25 mm), a granule (e.g., a granule having an average diameter of about 0.3 mm to about 0.85 mm), a fiber, an extruded particle, or a bead. The activated carbon can be of any suitable size. In a preferred embodiment, the activated carbon is a powdered activated carbon having a particle size (e.g., an average particle size) of about 1 μm to about 500 μm, about 10 μm to about 100 μm, or about 10 μm to about 50 μm.

The filtration medium can comprise any suitable amount of activated carbon. When the textile substrate comprises activated carbon fibers, any suitable amount of the fibers in the textile substrate can be activated carbon fibers. For example, the textile substrate can be composed entirely of activated carbon fibers. When the mercury abatement coating comprises activated carbon, the activated carbon can be present in the coating in any suitable amount. Preferably, the mercury abatement coating comprises about 1 wt. % or more, about 2 wt. % or more, about 3 wt. % or more, about 4 wt. % or more, or about 5 wt. % or more of activated carbon (e.g., activated carbon particles) based on the total weight of the mercury abatement coating. In another preferred embodiment, the mercury abatement coating comprises about 30 wt. % or less or about 25 wt. % or less of activated carbon (e.g., activated carbon particles) based on the total weight of the mercury abatement coating. In one particular preferred embodiment, the mercury abatement coating comprises about 5 wt. % to about 25 wt. % of activated carbon (e.g., activated carbon particles) based on the total weight of the mercury abatement coating.

The amount of activated carbon present in the mercury abatement coating can also be related to the amount of the copper salt present in the coating. Preferably, the ratio (determined by the weight of each component present in the coating) of copper salt to activated carbon in the coating is no less than about 1:10. In another preferred embodiment, the ratio of copper salt to activated carbon in the coating is about 0.2:1 or more, about 0.5:1 or more, or about 1:1. In a series of particular embodiments, the ratio copper salt to activated carbon the coating is about 0.2:1 to about 1:10, about 0.5:1 to about 1:10, or about 1:1 to about 1:10.

The mercury abatement coating preferably comprises a binder. The binder can be any suitable material that binds the components of the coating together and to the surface of the textile material. Preferably, the binder is hydrophobic. While not wishing to be bound to any particular theory, it is believed that a hydrophobic binder helps to repel moisture present in the combustion gas environment. This moisture can reduce the efficacy of the components in the coating and can also carry corrosive combustion products (e.g., acidic combustion products) that can degrade the coating. In a preferred embodiment, the binder is selected from the group consisting of silicone resins, fluorinated polymers, and mixtures thereof. Suitable silicone resin binders include, but are not limited to, polydimethylsiloxanes, polydiphenylsiloxanes, perfluorinated silicone polymers, and polyphenylmethylsiloxanes. Suitable fluorinated polymers include, but are not limited to, polyvinylidene fluoride, copolymers of vinylidene fluoride and hexafluoropropylene, copolymers of vinylidene fluoride and methyl methacrylate, perfluorinated polyethers, polytetrafluoroethylene, and fluoroethylene vinyl ether polymers. The binder can comprise one or more polymers in addition to the hydrophobic polymers described above. For example, the binder can comprise phenol-formaldehyde resins, epoxy resins, acrylic resins, and other similar resins.

The binder can be present in the mercury abatement coating in any suitable amount. Preferably, the binder is present in the mercury abatement coating in an amount of about 1 wt. % or more, about 2 wt. % or more, about 3 wt. % or more, about 4 wt. % or more, or about 5 wt. % or more based on the total weight of the mercury abatement coating. In another preferred embodiment, the binder is present in the mercury abatement coating in an amount of about 30 wt. % or less, about 25 wt. % or less, or about 20 wt. % or less based on the total weight of the mercury abatement coating. In one particular preferred embodiment, the binder is present in the mercury abatement coating in an amount of about 5 wt. % to about 25 wt. % based on the total weight of the mercury abatement coating.

The mercury abatement coating can further comprise a repellent. The repellent is believed to provide the same benefit of repelling moisture as a hydrophobic binder. Therefore, when the mercury abatement coating comprises a binder that does not exhibit appreciable hydrophobicity, the mercury abatement coating preferably comprises a repellent. Suitable repellents include, but are not limited to, perfluorinated resins derived from a $C_4$-$C_8$ perfluorinated monomer, silicone polymers, and copolymers of silicone and fluorinated monomers. The repellent can be present in the mercury abatement coating in any suitable amount. Preferably, the repellent is present in the mercury abatement coating in an amount of about 1 wt. % to about 5 wt. % based on the total weight of the coating.

The mercury abatement coating can further comprise a chelating agent capable of chelating copper ions. Suitable chelating agents include, but are not limited to, ammonia, ammonium salts (e.g., ammonium hydroxide), ethylenediaminetetraacetic acid (EDTA), EDTA salts, and simple amine compounds, such as monoethanol amine and triethylamine. While not wishing to be bound to any particular theory, it is believed that the chelating can reduce the crystal size of the copper salt in the coating, thereby providing a larger surface area for reaction with elemental mercury in a flue gas stream. The chelating agent can be present in the mercury abatement coating in any suitable amount. Preferably, the chelating agent is present in the mercury abatement coating in an amount of about 1 wt. % to about 20 wt. % based on the total weight of the coating.

The mercury abatement coating can further comprise one or more mercury capture salts in addition to the components listed above. In a preferred embodiment, the mercury capture salts are selected from the group consisting of NaI, KI, $NH_4I$, $Na_2SO_4$, $K_2SO_4$, $Na_2SO_3$, $Na_2HPO_4$, $Na_2SiO_3$, $Na_2CO_3$, and mixtures thereof. The mechanism by which these compounds function is not completely understood. However, Applicant has observed that including these compounds in the mercury abatement coating increases the amount of mercury that is absorbed and retained on the filtration medium.

The mercury capture salt can be present in the mercury abatement coating in any suitable amount. Preferably, the mercury capture salt is present in the mercury abatement coating in an amount of about 5 wt. % or more or about 10 wt. % or more based on the total weight of the mercury abatement coating. In another preferred embodiment, the mercury capture salt is present in the mercury abatement coating in an amount of about 60 wt. % or less, about 50 wt. % or less, about 40 wt. % or less, or about 30 wt. % or less based on the total weight of the mercury abatement coating. Thus, in another preferred embodiment, the mercury capture salt preferably is present in the mercury abatement coating in an amount of about 5 to about 60 wt. % (e.g., about 10 to about 60 wt. %), about 5 to about 40 wt. % (e.g., about 10 to about 40 wt. %), about 5 to about 30 wt. % (e.g., about 10 to about 30 wt. %), or about 5 to about 20 wt. % (e.g., about 10 to about 20 wt. %) based on the total weight of the mercury abatement coating.

The mercury abatement coating can be present on the textile substrate (and in the filtration medium) in any suitable amount. Typically, the amount of the coating is expressed in terms of the weight of the coating per unit of area of the textile substrate. Preferably, the mercury abatement coating is present on the textile substrate in an amount of about 68 g or more, about 100 g or more, or about 170 g or more per square meter of the textile substrate. In another preferred embodiment, the mercury abatement coating is present on the textile substrate in an amount of about 1,000 g or less, 850 g or less, about 678 g or less, or about 510 g or less per square meter of the textile substrate. In one specific preferred embodiment, the mercury abatement coating is present on the textile substrate in an amount of about 170 g to about 510 g per square meter of the textile substrate.

In a second embodiment of the filtration medium, the mercury abatement coating comprises chloride cations, an iodide salt, and a binder. In such an embodiment, the mercury abatement coating can further comprise a chloride salt, a bromide salt, activated carbon particles, a repellent, a chelating agent, and a mercury capture salt as described above in connection with the first embodiment of the filtration medium. Further, the copper salt, chloride salt (if present), bromide salt (if present), activated carbon particles (if present), repellent (if present), chelating agent (if present), and mercury capture salt (if present) can be present in the mercury abatement coating in any suitable amount, including any of the amounts described above in connection with the first embodiment of the filtration medium.

The iodide salt used in this second embodiment of the filtration medium can be any suitable salt comprising iodide anions. Suitable iodide salts include, but are not limited to, CuI, NaI, KI, $NH_4I$, and mixtures thereof. In this second embodiment of the filtration medium, the iodide salt can be present in the mercury abatement coating in any suitable amount. Preferably, the iodide salt is present in the mercury abatement coating to provide a ratio of halide anions to copper cations falling within ranges recited above in the discussion of the first embodiment of the filtration medium.

The filtration medium can further comprise a gas-permeable membrane, which is shown as 106 in FIGS. 1, 2, and 3. The gas-permeable membrane can be disposed on any suitable surface of the textile substrate, but typically the membrane 106 is disposed on the surface opposite the surface on which the mercury abatement coating 104 is disposed. Preferably, the gas-permeable membrane is disposed on the "upstream" surface of the filtration medium (i.e., the surface of the medium that is first contacted by the fluid stream when the medium is in use). In such an arrangement, the gas-permeable membrane is able to block fine particulates in the fluid stream (e.g., flue gas stream) and reduce the amount of particulates accumulating in the filtration medium. These fine particulates can adversely affect the gas permeability of the filtration medium and also affect the mercury abatement coating's ability to oxidize elemental mercury. The gas-permeable membrane can be any suitable membrane that is permeable to gases, can block fine particulates, and can withstand the fluid stream (e.g., flue gas) environment. Preferably, the gas-permeable membrane is a porous polytetrafluoroethylene film.

The filtration medium can be made by any suitable process. For example, the filtration medium can be made by coating, impregnating, or spraying a coating composition onto a surface of the textile substrate. The coating composition comprises the components of the mercury abatement coating. After drying, the components in the coating composition form a coating on at least one surface of the textile substrate.

Figure 4:
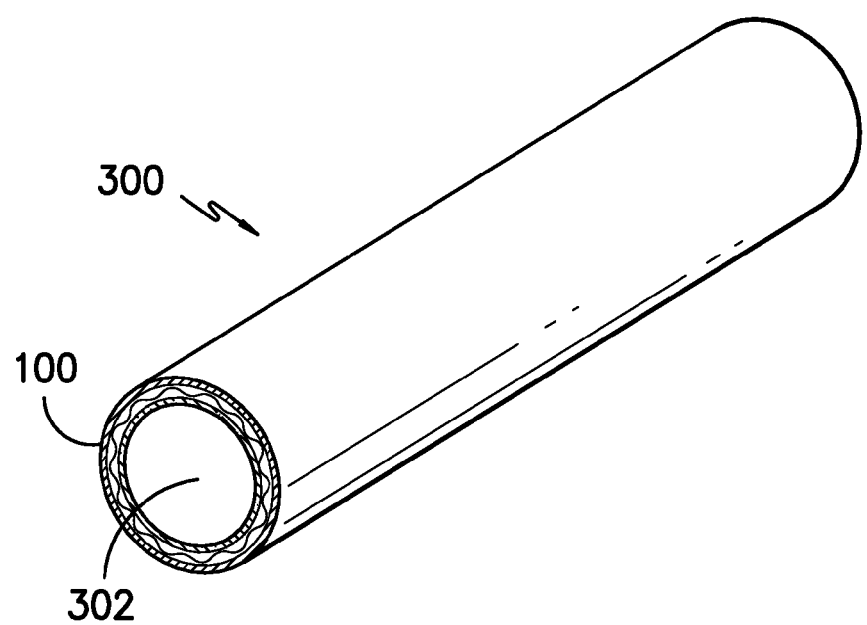
FIG. 4 is a perspective view of a tubular filter made with the filtration medium of the invention.

The filtration medium can be used to make any suitable filtration apparatus or article. For example, as depicted in FIG. 4, the filtration medium 100 can be fashioned into a tubular filter 300. The tubular filter 300 comprises an opening 302 and a closed end opposite the open end (not shown). The opening 302 permits gases to pass into and/or out of the interior volume of the tubular filter 300 enclosed by the filtration medium 100. Such a tubular filter can be configured for use in a variety of filtration apparatus. For example, such a tubular filter can be configured for use in a baghouse filtration apparatus, such as a mechanical shaker baghouse filtration apparatus, a reverse air baghouse filtration apparatus, or a reverse jet baghouse filtration apparatus.

In a second embodiment, the invention provides a process for removing mercury from a fluid stream (e.g., a gaseous stream), such as a flue gas stream. The process generally comprises the steps of providing a gaseous stream, providing a filtration medium, and passing the gaseous stream through the filtration medium. The gaseous stream can comprise mercury, preferably elemental mercury. The filtration medium can be any of the filtration media described above in connection with the first embodiment of the invention. As the gaseous stream passes through the filtration medium, the components in the mercury abatement coating react to oxidize elemental mercury contained in the gaseous stream. The mercury that is oxidized can become entrapped in the filtration medium. Thus, once the gaseous stream is passed through the filtration medium, at least a portion of the mercury is removed from the gaseous stream. The filtration medium used in the process can be any embodiment of the filtration medium described above in connection with the first embodiment of the invention.

Figure 5:
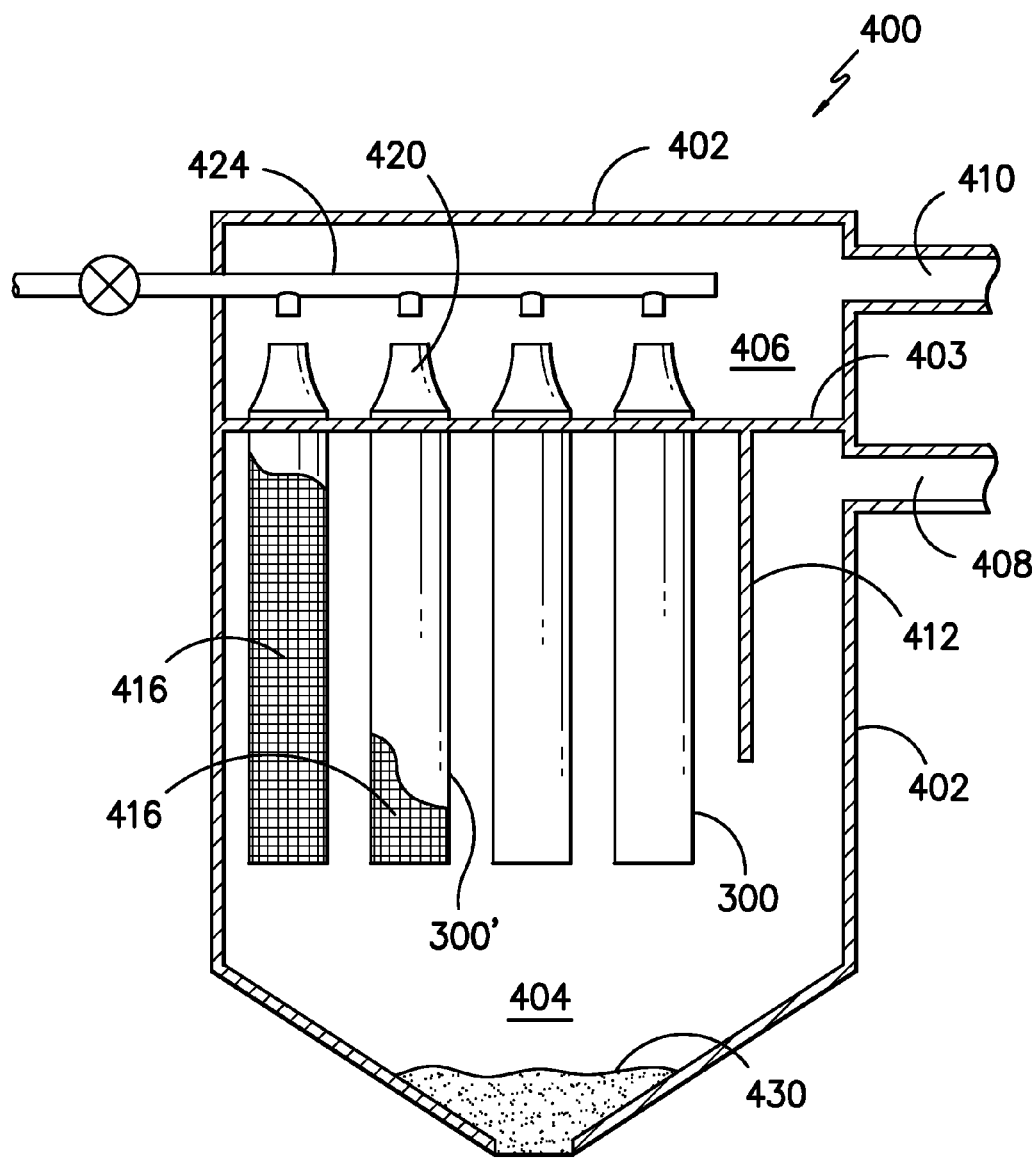
FIG. 5 is a cross-sectional view of a reverse-jet baghouse containing tubular filters such as those depicted in FIG. 4.

The above-described process can be performed in any suitable apparatus. For example, the process can be performed in a baghouse filtration apparatus, such as a mechanical shaker baghouse filtration apparatus, a reverse air baghouse filtration apparatus, or a reverse jet baghouse filtration apparatus. FIG. 5 depicts a reverse jet baghouse filtration apparatus configured to perform the above-described process. The reverse jet baghouse filtration apparatus 400 comprises an exterior shell enclosing an interior volume that is separated by a partition 403 into an inlet volume 404 and an outlet volume 406. The gaseous stream enters the apparatus 400 via an inlet 408 where it encounters a baffle 412 that changes the direction of the incoming gases to more evenly distribute the gaseous stream throughout the inlet volume 404. A plurality of filters 300, 300' are disposed in the inlet volume 404. The filters 300, 300' are slipped over filter support cages 416 that maintain the filters in the proper orientation and prevent them from collapsing under the pressure exerted by the incoming gaseous stream. The filter 300' is partially cutaway to show the underlying filter support cage 416. The gaseous stream passes through the filters 300, 300' an into the outlet volume 406 where the gases then exit the apparatus 400 via the outlet 410. The outlet volume 406 contains a plurality of Venturi nozzles 420. Each Venturi nozzle 420 is connected to the interior volume enclosed by one of the filters 300, 300'. The outlet volume 406 also contains a compressed air manifold 424. The compressed air manifold 424 comprises a plurality of outlets positioned to direct compressed air into the Venturi nozzles 420. During operation of the apparatus 400, short bursts of compressed air (typically on the order of 0.1-1 seconds in duration) are injected into the apparatus 400 via the compressed air manifold 424. The compressed air passes through the Venturi nozzles 420 and into the interior volumes of the filters 300, 300'. This compressed air creates a rapidly moving gas bubble that travels down through the filters 300, 300' causing the exterior surfaces of each filter to flex or vibrate. This movement of the filters 300, 300' dislodges particulate matter 430 that has collected on the exterior surfaces of the filters (the surfaces of the filters facing out into the inlet volume 404) causing the particulate matter 430 to fall to the bottom of the inlet volume 404 where it collects and can later be recovered for disposal.

The flue gases produced by the combustion of fossil fuels (e.g., coal) in boilers or other plants typically contain relatively little gaseous oxygen as compared to atmospheric conditions. A typical flue gas can contain as little as 1% or less of gaseous oxygen, whereas air contains about 16% gaseous oxygen. While not wishing to be bound to any particular theory, it is believed that introducing additional oxygen into the gaseous stream (either continuously or intermittently) can improve the ability of the mercury abatement coating to oxidize elemental mercury. Thus, in a preferred embodiment, the process further comprises the step of introducing (either continuously or intermittently) gaseous oxygen (either as pure gaseous oxygen or as a gas containing gaseous oxygen, such as air) into the gaseous stream before the stream contacts the filtration medium. Thus, when an apparatus such as that depicted in FIG. 5 is used, the gaseous oxygen can be introduced into the gaseous stream upstream of the inlet 408 or it can be introduced directly into the inlet volume 404 by means of an additional inlet (not pictured).

In order to increase the amount of mercury removed from the gaseous stream, the gaseous stream can be passed through a wet scrubber after is it passed through the filtration medium. While passing the gaseous stream through the filtration medium results in the removal of a portion of the mercury in the gaseous stream (through oxidation of the elemental mercury and entrapment in the filtration medium), a wet scrubber can remove additional amounts of oxidized mercury from the gaseous stream, resulting in an overall lower amount of mercury in the gases exiting the process. The wet scrubber can be any suitable wet scrubber, such as any of the wet desulfurization scrubbers currently used in flue gas desulfurization.

The following examples further illustrate the subject matter described above but, of course, should not be construed as in any way limiting the scope thereof.

Example 1

This example demonstrates the production and performance of a filtration medium according to the invention.

Approximately 1 g of $CuCl_2.2H_2O$ was dissolved in approximately 59 grams of deionized (DI) water. Then, approximately 40 g of Kynar Aquatec ARC latex binder was added to the solution and thoroughly mixed. The resulting mixture was padded onto a polyphenylene sulfide (PPS) nonwoven filter (a needle punched nonwoven weighing about 15 oz/yd$^2$ (about 510 g/m$^2$)) at a wet pick-up of approximately 100%. The coated filter was then dried at a temperature of 350° F. (180° C.) for approximately 6 minutes.

A circular sample was cut from the coated nonwoven filter and placed in a mercury flow chamber as a filter disc. The gas flowing through the chamber had an initial mercury concentration of 56.6 μg/m$^3$ and a gas temperature of approximately 160° C. The air-to-cloth ratio in the mercury flow chamber was 4.2 feet/min (1.3 m/min). The concentration of mercury in the gas was monitored and slowly dropped to 27.1 μg/m$^3$. This indicated that approximately 52% of the mercury had been removed from the gas stream.

Example 2

This example demonstrates the production and performance of a filtration medium according to the invention.

Approximately 1 g of $CuCl_2.2H_2O$ and 1 g of KBr were dissolved in approximately 58 grams of DI water. Then, approximately 40 g of Kynar Aquatec ARC latex binder was added to the solution and thoroughly mixed. The resulting mixture was padded onto a polyphenylene sulfide (PPS) nonwoven filter similar to that used in Example 1 at a wet pick-up of approximately 100%. The coated filter was then dried at a temperature of 350° F. (180° C.) for approximately 6 minutes.

A circular sample was cut from the coated nonwoven filter and placed in a mercury flow chamber as a filter disc. The gas flowing through the chamber had an initial mercury concentration of 63.4 μg/m$^3$ and a gas temperature of approximately 160° C. The air-to-cloth ratio in the mercury flow chamber was 4.2 feet/min (1.3 m/min). The concentration of mercury in the gas was monitored and quickly dropped to 7.6 μg/m$^3$. This indicated that approximately 88% of the mercury had been removed from the gas stream.

Example 3

This example demonstrates the production and performance of a filtration medium according to the invention.

Approximately 10 g of $CuCl_2.2H_2O$ was dissolved in approximately 20 grams of an aqueous $NH_4OH$ solution. Then, approximately 35 g of RF264-C activated carbon (40% activated carbon dispersion) and 35 grams Polon MF-56 silicone binder were added to the solution and thoroughly mixed. The resulting mixture was padded onto a polyphenylene sulfide (PPS) nonwoven filter similar to that used in the preceding examples at a wet pick-up of approximately 100%. The coated filter was then dried at a temperature of 350° F. (180° C.) for approximately 6 minutes.

A circular sample was cut from the coated nonwoven filter and placed in a mercury flow chamber as a filter disc. The gas flowing through the chamber had an initial mercury concentration of 141.7 μg/m$^3$ and a gas temperature of approximately 160° C. The air-to-cloth ratio in the mercury flow chamber was 4.2 feet/min (1.3 m/min). The concentration of mercury in the gas was monitored and slowly dropped to 2.5 μg/m$^3$. This indicated that approximately 98.3% of the mercury had been removed from the gas stream.

Example 4

This example demonstrates the production and performance of a filtration medium according to the invention.

Approximately 10 g of $CuCl_2.2H_2O$ and 14 g KBr were dissolved in approximately 24 grams of DI water. Then, approximately 26 of RF264-C activated carbon (40% activated carbon dispersion) and 26 grams Polon MF-56 silicone binder were added to the solution and thoroughly mixed. The resulting mixture was padded onto a polyphenylene sulfide (PPS) nonwoven filter similar to that used in the preceding examples at a wet pick-up of approximately 100%. The coated filter was then dried at a temperature of 350° F. (180° C.) for approximately 6 minutes.

A circular sample was cut from the coated nonwoven filter and placed in a mercury flow chamber as a filter disc. The gas flowing through the chamber had an initial mercury concentration of 145 μg/m$^3$ and a gas temperature of approximately 160° C. The air-to-cloth ratio in the mercury flow chamber was 4.2 feet/min (1.3 m/min). The concentration of mercury in the gas was monitored and slowly dropped to 0 μg/m$^3$. This indicated that approximately 100% of the mercury had been removed from the gas stream.

Example 5

This example demonstrates the production and performance of a filtration medium according to the invention.

A PPS nonwoven fabric was padded with two compositions sequentially. The first padding compositions comprised about 20 parts of a 40% activated carbon suspension, 2 parts of copper chloride, 20 parts of silicone binder Polon MF-56, 1 part surfactant Triton X705, 1 part thicker RM5000 and 56 parts of water. The second padding composition comprised about 25 parts of a 40% activated carbon suspension, 8 parts of sodium iodide, 20 parts of silicone binder Polon MF-56, 1 part surfactant triton X705, 1 part thicker RM5000 and 45 parts of water. The fabric was dried between applications of each padding composition. The nonwoven textile gained about 4 oz/yd$^2$ (about 140 g/m$^2$) after the application and drying of the first coating and gained an additional approximately 8 oz/yd$^2$ (about 270 g/m$^2$) after the application and drying of the second coating. The non-woven fabric had an air permeability of approximately 48 cfm at 125 Pa pressure (approximately 1.4 m$^3$/min) before applying the first layer coating and of approximately 38 cfm at 125 Pa pressure (approximately 1.1 m$^3$/min) after the first layer coating, and of approximately 16 cfm at 125 Pa pressure (0.45 m$^3$/min) after the second layer coating.

A circular sample was cut from the coated nonwoven filter and placed in a mercury flow chamber. The gas flowing through the chamber had an initial mercury concentration of 250 μg/m$^3$ and a gas temperature of approximately 170° C. The air-to-cloth ratio in the mercury flow chamber was 4.2 feet/min (1.3 m/min). The concentration of mercury in the gas was monitored and slowly dropped to 0 μg/m$^3$. This indicated that approximately 100% of the mercury had been removed from the gas stream.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A filtration medium comprising:
   (a) a textile substrate, the textile substrate being permeable to gases and having at least one surface; and
   (b) a mercury abatement coating disposed on at least a portion of the surface of the textile substrate, the mercury abatement coating comprising:
      (i) a copper salt comprising copper cations selected from the group consisting of copper(I) cations, copper(II) cations, and mixtures thereof;
      (ii) optionally a chloride salt, provided the chloride salt must be present when the copper salt does not comprise chloride anions;
      (iii) optionally activated carbon particles; and
      (iv) a binder,
   wherein the ratio of halide anions to copper cations in the mercury abatement coating is about 2:1 or more.

2. The filtration medium of claim 1, wherein the textile substrate comprises fibers selected from the group consisting of activated carbon fibers, glass fibers, polyphenylenesulfide fibers, polyester fibers, acrylic fibers, ceramic fibers, polyimide fibers, aramid fibers, poly(tetrafluoroethylene) fibers, and mixtures thereof.

3. The filtration medium of claim 1, wherein the textile substrate is a woven textile material.

4. The filtration medium of claim 1, wherein the textile substrate is a nonwoven textile material.

5. The filtration medium of claim 1, wherein the copper salt is a copper(II) salt.

6. The filtration medium of claim 5, wherein the copper salt is selected from the group consisting of $CuCl_2$, $CuBr_2$, $CuI$, $CuSO_4$, $CuNO_3$, $Cu_3(PO_4)_2$, $CuCO_3$, $CuS$, $Cu(OH)_2$, $CuF_2$, $Cu(C_2H_3O_2)_2$, and mixtures thereof.

7. The filtration medium of claim 1, wherein the copper salt is present in the mercury abatement coating in an amount of about 5 to about 30 wt. % based on the total weight of the mercury abatement coating.

8. The filtration medium of claim 1, wherein the mercury abatement coating further comprises a bromide salt.

9. The filtration medium of claim 1, wherein the ratio of halide anions to copper cations in the mercury abatement coating is about 4:1 or more.

10. The filtration medium of claim 1, wherein the copper salt is $CuCl_2$, the mercury abatement coating further comprises KBr, and the molar ratio of $CuCl_2$ to KBr is about 1:2.

11. The filtration medium of claim 1, wherein the activated carbon particles are present in the mercury abatement coating in an amount of about 5 to about 25 wt. % based on the total weight of the mercury abatement coating.

12. The filtration medium of claim 1, wherein the binder is selected from the group consisting of silicone resins, fluorinated polymers, and mixtures thereof.

13. The filtration medium of claim 1, wherein the binder is present in the mercury abatement coating in an amount of about 5 to about 20 wt. % based on the total weight of the mercury abatement coating.

14. The filtration medium of claim 1, wherein the mercury abatement coating is present in the filtration medium in an amount of about 68 g or more per square meter of the textile substrate.

15. The filtration medium of claim 14, wherein the mercury abatement coating is present in the filtration medium in an amount of about 170 to about 510 g per square meter of the textile substrate.

16. The filtration medium of claim 1, wherein the mercury abatement coating further comprises a repellent.

17. The filtration medium of claim 1, wherein the filtration medium further comprises a gas-permeable membrane disposed on a surface of the textile substrate.

18. A process for removing mercury from a gaseous stream, the process comprising the steps of:
   (a) providing a gaseous stream comprising mercury;
   (b) providing the filtration medium of claim 1;
   (c) passing the gaseous stream through the filtration medium, thereby removing at least a portion of the mercury from the gaseous stream.

19. The process of claim 18, wherein the gaseous stream is a flue gas produced by the combustion of coal.

20. The process of claim 18, wherein, after the gaseous stream is passed through the filtration medium, the gaseous stream is passed through a wet scrubber to remove additional mercury from the gaseous stream.

21. The process of claim 19, wherein gaseous oxygen is introduced into and mixed with the flue gas prior to passing the flue gas through the filtration medium.

22. A filtration medium comprising:
   (a) a textile substrate, the textile substrate being permeable to gases and having at least one surface; and
   (b) a mercury abatement coating disposed on at least a portion of the surface of the textile substrate, the mercury abatement coating comprising:
      (i) a copper salt comprising copper cations selected from the group consisting of copper(I) cations, copper(II) cations, and mixtures thereof;
      (ii) an iodide salt; and
      (iii) a binder,
   wherein the ratio of halide anions to copper cations in the mercury abatement coating is about 2:1 or more.

23. The filtration medium of claim 22, wherein the copper salt is selected from the group consisting of $CuCl_2$, $CuBr_2$, $CuI$, $CuSO_4$, $CuNO_3$, $Cu_3(PO_4)_2$, $CuCO_3$, $CuS$, $Cu(OH)_2$, $CuF_2$, $Cu(C_2H_3O_2)_2$, and mixtures thereof.

24. The filtration medium of claim 23, wherein the copper salt is $CuCl_2$.

25. The filtration medium of claim 22, wherein the mercury abatement coating further comprises a chloride salt when the copper salt does not comprise chloride anions.

26. The filtration medium of claim 22, wherein the mercury abatement coating further comprises activated carbon particles when the textile substrate does not comprise activated carbon fibers.

27. The filtration medium of claim 22, wherein the ratio of halide anions to copper cations in the mercury abatement coating is about 4:1 or more.

* * * * *